(12) United States Patent
Hanson

(10) Patent No.: US 7,209,174 B2
(45) Date of Patent: Apr. 24, 2007

(54) MOVABLE STATUS DISPLAY WITHIN A CAMERA-BACK DISPLAY OF AN IMAGE CAPTURING DEVICE

(75) Inventor: David Hanson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

(21) Appl. No.: 10/083,823

(22) Filed: Feb. 27, 2002

(65) Prior Publication Data
US 2003/0160884 A1 Aug. 28, 2003

(51) Int. Cl.
*H04N 5/222* (2006.01)

(52) U.S. Cl. .............................. 348/333.02; 348/333.04

(58) Field of Classification Search ........... 348/333.02, 348/333.01, 333.04, 333.03
See application file for complete search history.

(56) References Cited

U.S. PATENT DOCUMENTS

| | | | |
|---|---|---|---|
| 5,570,156 A | * | 10/1996 | Arai et al. .................... 396/51 |
| 5,579,048 A | * | 11/1996 | Hirasawa ................ 348/333.02 |
| 6,154,210 A | | 11/2000 | Anderson .................... 345/354 |
| 6,549,218 B1 | * | 4/2003 | Gershony et al. ............ 715/781 |
| 6,633,336 B2 | * | 10/2003 | Toyoizumi et al. ..... 348/333.02 |
| 2002/0001032 A1 | * | 1/2002 | Ohki .......................... 348/207 |
| 2002/0030754 A1 | * | 3/2002 | Sugimoto .............. 348/333.02 |
| 2002/0171747 A1 | * | 11/2002 | Niikawa et al. ........ 348/333.01 |
| 2002/0180802 A1 | * | 12/2002 | Ogawa et al. ............... 345/809 |

FOREIGN PATENT DOCUMENTS

EP 0946045 9/1999

* cited by examiner

*Primary Examiner*—Ngoc-Yen Vu
*Assistant Examiner*—Anthony J. Daniels

(57) ABSTRACT

An image capturing device includes a camera-back display and a status display provided within the camera-back display. The status display displays one or more status information items of said image capturing device. A user is able to turn the status display on and off and can change the position of the status display within the camera-back display.

26 Claims, 3 Drawing Sheets

MOVABLE STATUS DISPLAY WITHIN A CAMERA-BACK DISPLAY OF AN IMAGE CAPTURING DEVICE

FIELD OF THE INVENTION

The present invention relates generally to an image capturing device, and more particularly to a status display for an image capturing device.

BACKGROUND OF THE INVENTION

Image capturing devices are widely used to capture scenes, persons, events, settings, etc. Image capturing devices, such as digital still cameras, typically include a camera-back display, such as an LCD screen. The camera-back display may be used to display captured images. The camera-back display may also be used to display a continuous sequence of images in a live view mode, wherein the user can press the shutter button at any time during the live view mode in order to capture an image.

The user may monitor camera status information during any type of image capturing in order to keep track of camera operating characteristics. The status information may include a battery power level, an image resolution setting, a flash status, etc. The user may need to monitor the status information before an image capture in order to determine that the image resolution is on a desired setting, to check the battery level, to determine whether the camera is in a proper flash mode, etc. Therefore, the user may often look at the status display before or during an image capturing session.

FIG. 1 shows a status display LCD according to the prior art. The prior art approach to monitoring camera status information has typically been done through such a display on the top of the camera. The prior art status display is typically an LCD display and is included in addition to a camera-back display, which is typically also an LCD display.

The status display according to the prior art has several drawbacks. The prior art status display is located at the top of the camera. The prior art places the status display on the top of the camera regardless of how inconvenient or undesirable this may be to the user. As a result, it is not easily viewed during an image capturing operation. The placement of the prior art status display is inconvenient because the user is looking through the view finder or at the camera-back display when the camera is in use, and not at the top of the camera. In addition, the prior art status display is not easily viewed during an image review mode, where the user is looking at the camera-back display. Moreover, there is no user control over the inclusion or placement of the prior art status display. Furthermore, the prior art status display requires duplicate LCD display devices and therefore is more costly to manufacture.

Therefore, there remains a need for improvements in image capturing devices.

SUMMARY OF THE INVENTION

An image capturing device comprises a camera-back display and a status display provided within the camera-back display. The status display displays one or more status information items of said image capturing device.

DETAILED DESCRIPTION

Figure 1:
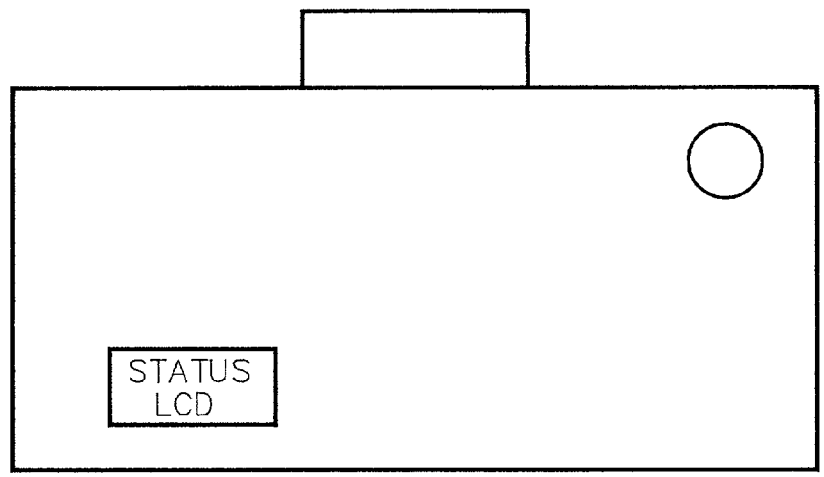
FIG. 1 shows a status LCD display according to the prior art.
Figure 2:
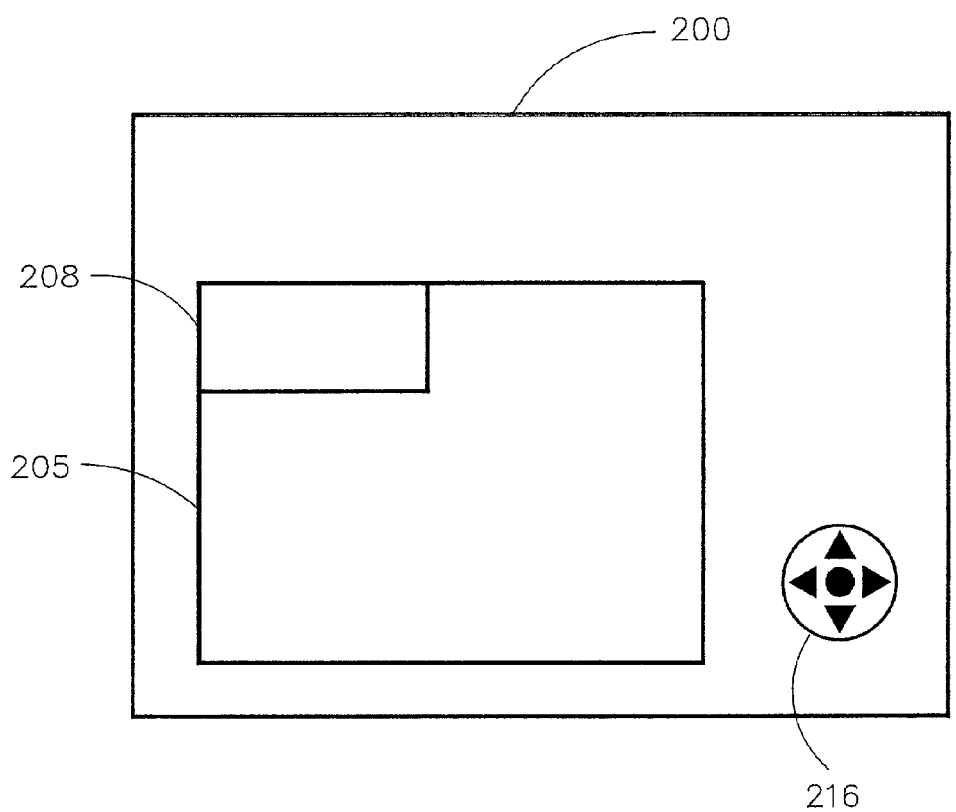
FIG. 2 is a rear view of an image capturing device according to one embodiment of the invention.

FIG. 2 is a rear view of an image capturing device 200 according to one embodiment of the invention. The image capturing device 200 includes a camera-back display 205 that includes a status display 208. The camera-back display 205 may be an LCD. In addition, the image capturing device 200 may include a status display control button 216.

The status display 208 may be used to display any manner of status information of the image capturing device 200. For example, the status information may include a battery power level, a flash mode (i.e., auto, off, on, etc.), and an image resolution (i.e., 640×480, 800×600, 1024×768, etc.). The status display 208 may cover only a portion of the camera-back display 205 (i.e., a picture-in-picture status display), or alternatively may cover an entire display area of the camera-back display 205.

The status display control button 216 in one embodiment comprises a four-way rocker switch that may be used to move the status display 208 within the camera-back display 205. The status display control button 216 may generate movement signals that may be used to position the status display 208 within the camera-back display 205. The status display control button 216 may include left, right, up, and down input contacts wherein corresponding left, right, up, and down movements of the status display 208 are generated by the processor 224 (see FIG. 3 and accompanying discussion).

Alternatively, in another embodiment the status display control button 216 comprises a five-way rocker switch that additionally includes a center press input switch. When pressed, the center press input switch may toggle (i.e., may enable and disable) the display enable state 234 of the status display 208 (see FIG. 3 and accompanying discussion). Therefore, the status display control button 216 in this embodiment may be used to show or hide the status display 208.

Figure 3:
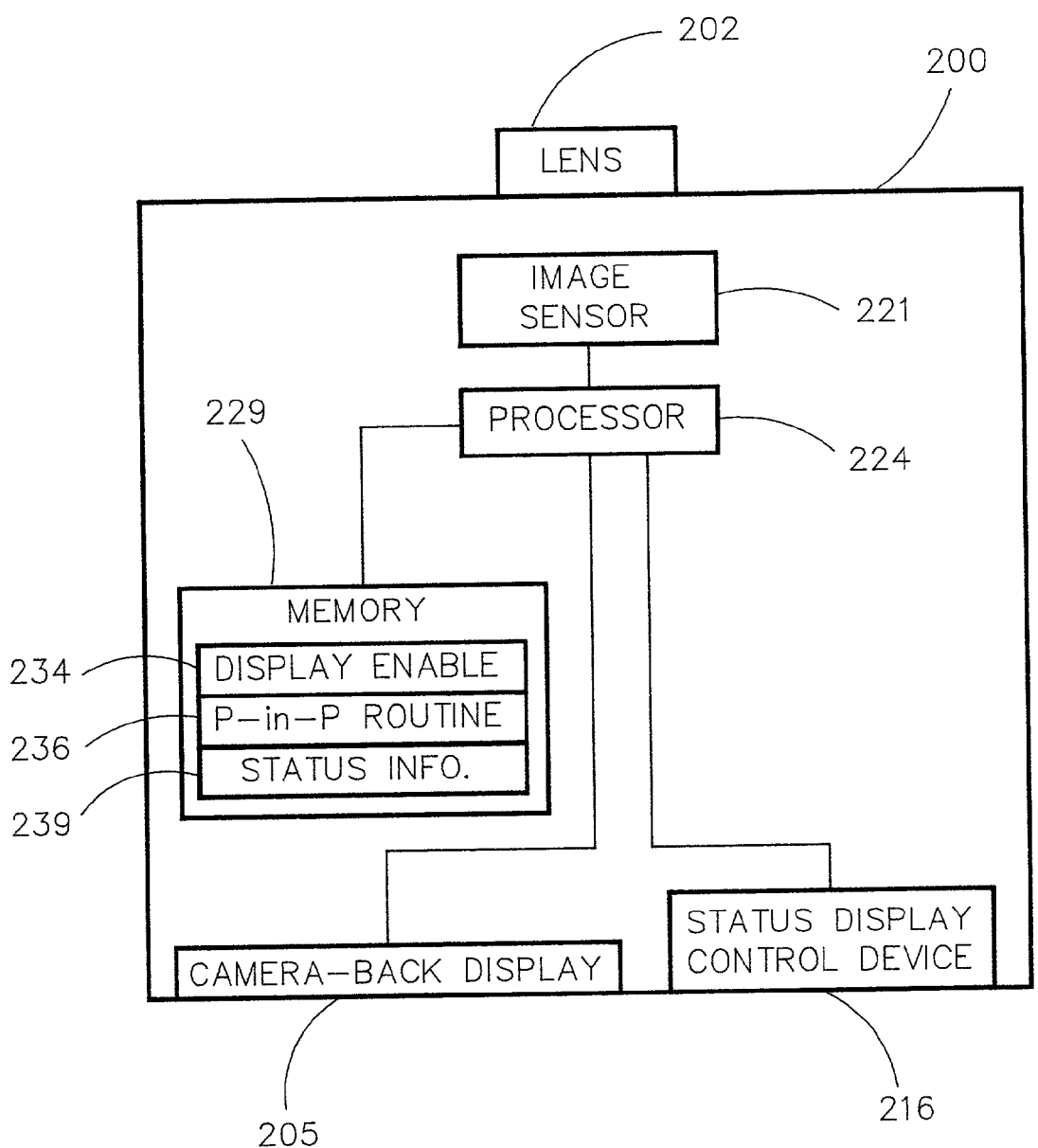
FIG. 3 is a schematic of the image capturing device according to another embodiment of the invention.

FIG. 3 is a schematic of the image capturing device 200 according to another embodiment of the invention. The image capturing device 200 includes a lens apparatus 202, an image sensor 221, a processor 224, the camera-back display 205, the status display control button 216, and a memory 229.

The image sensor 221 may be any type of electronic image sensor capable of capturing images, such as a charge coupled device (CCD) sensor or a complementary metal oxide semiconductor (CMOS) sensor, for example.

The processor 224 may be any type of general purpose processor. The processor 224 executes a control routine contained in the memory 229. In addition, the processor 224 receives inputs and conducts image capturing operations.

The memory 229 may be any type of digital memory. The memory 229 may include a display enable variable 234, a picture-in-picture routine 236, and one or more status information items 239. In addition, the memory 229 may store software or firmware to be executed by the processor 224. Furthermore, the memory 229 may store captured images.

The display enable variable 234 determines whether the status display 208 is displayed within the camera-back display 205. The display enable variable 234 may be toggled by a center press of the status display control button 216. Alternatively, the display enable variable 234 may be toggled by any other manner of user input device, such as buttons, switches, a user interface, etc.

The picture-in-picture routine 236 is a software routine used by the processor 224 to generate the status display 208 within the camera-back display 205. The picture-in-picture routine 236 takes into account user inputs that may control the size and placement of the status display. In addition, the picture-in-picture routine 236 displays selected status information items. The selected status information items may be a default group of status information items or may be selected by the user. Therefore, the status display 208 according to the invention allows more flexibility in the display of status information and allows the user to choose which status information to display.

The one or more status information items 239 may be any manner of stored status information for the image capturing device 200. The one or more status information items 239 may include, for example, a battery power level, a flash mode setting, an image resolution setting, a number of captured images currently stored in the memory 229, etc.

Figure 4:
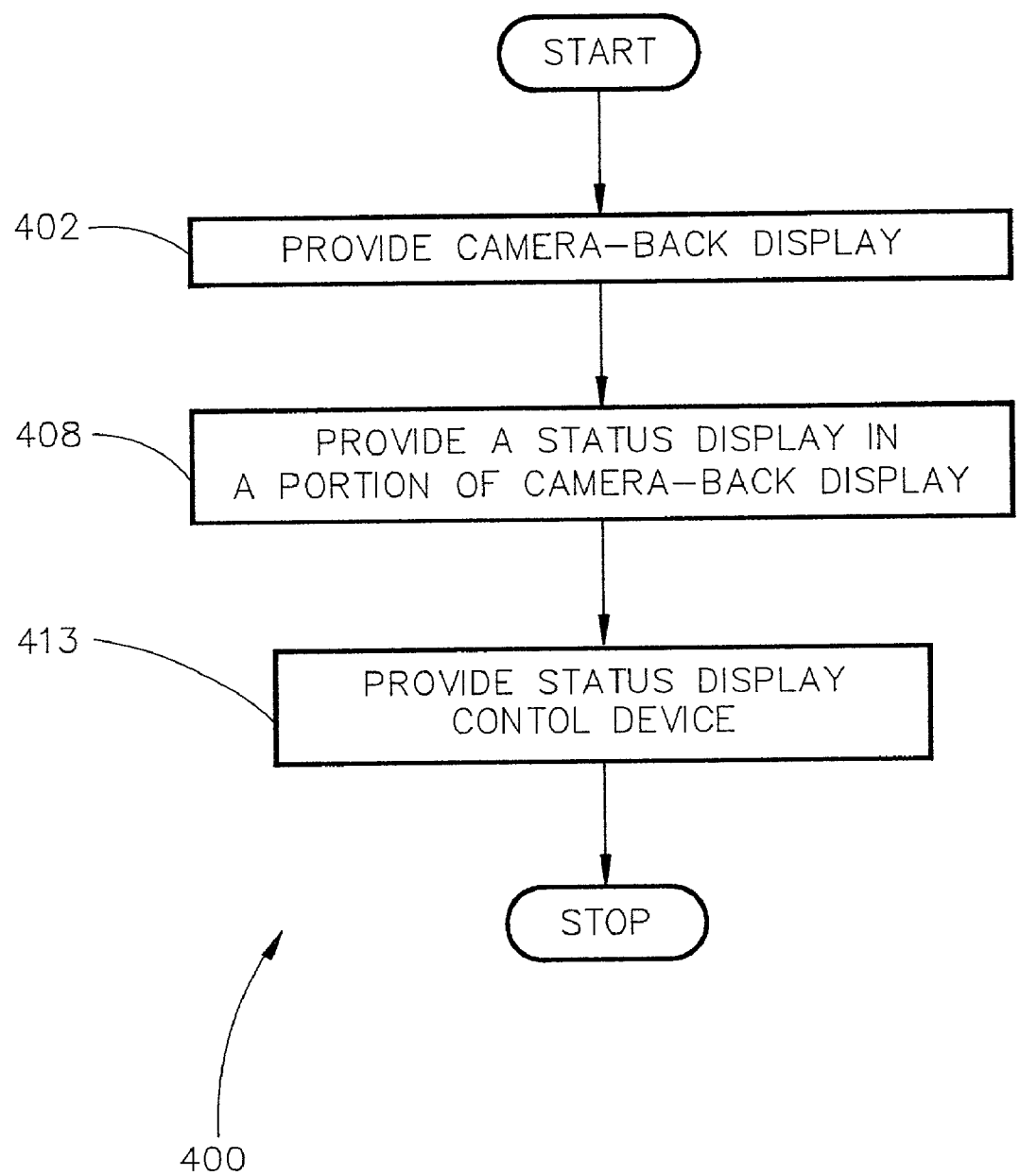
FIG. 4 is a flowchart of a status information display method for an image capturing device.

FIG. 4 is a flowchart 400 of a status information display method for an image capturing device. In step 402, a camera-back display 205 is provided on the image capturing device 200.

In step 408, a status display 208 is provided in a portion of the camera-back display 205. The status display 208 may cover part or all of the camera-back display 205. The status information items may be user selectable.

In step 413, a status display control button 216 is provided. The status display control button 216 may control the position of the status display 208 within the camera-back display 205. In addition, the status display control button 216 may control the size of the status display 208. Furthermore, the status display control button 216 may enable and disable the status display 208.

In one embodiment, the status display 208 may continue to be displayed on the camera-back display 205 even when there is no image being displayed, i.e., the rest of the camera-back display 205 may be dark. Therefore, the user may be able to view the status information even when the image capturing device 200 is not in an image capturing mode.

The status display according to the invention may be applied to any type of image capturing device. In one embodiment, the image capturing device may be a digital still camera. In another embodiment, the image capturing device may be a digital or analog video camera including a small display screen.

The status display according to the invention provides several benefits. A cost reduction is achieved due to the elimination of a separate dedicated status display. The status display can show any type of status information. The status display can show varying numbers of status information items. Therefore, the status display according to the invention may include more status information items than can typically be accommodated by a status display according to the prior art.

Another benefit of the invention is that the status display may be user selectable, wherein the user can select various amounts of status information to be displayed and may select the size and position of the status display.

Yet another benefit of the invention is that the status display is positioned on the back of the camera where it can be seen during a review mode of capturing images. The status display can also be seen during image capture, if the image capture is performed during a live mode. Moreover, the status display may now be more easily seen even if the user is using the viewfinder to capture an image, as the user will have to draw only slightly away from the viewfinder in order to see the status display within the camera-back display.

Moreover, the user can enable and disable the status display so that the status display can be removed from the camera-back display if desired. This may be desired by the user during the picture capturing mode wherein the user views the status information before initiating the image capture mode and then turns it off during the remainder of the image capturing mode.

I claim:

1. An image capturing device, comprising:
   a main body;
   a camera-back display located on a back region of said main body and adapted to display a captured image in a display area;
   a status display provided within said display area of said camera-back display and adapted to display status information of said image capturing device; and
   a status display control device located on said back region that enables a user of the image capturing device to manually move said status information vertically and horizontally to substantially any position within said camera-back display, wherein
   said status display control device comprises a center press input switch that toggles an enable state of said status display when pressed.

2. The image capturing device of claim 1, wherein said status display comprises a picture-in-picture display within said camera-back display.

3. The image capturing device of claim 1, wherein the status display control device controls a size of said status display within said camera-back display.

4. The image capturing device of claim 1, wherein the status display control device enables and disables said status display.

5. An image capturing device, comprising:
   a camera-back display located on a back region of a main body of said image capturing device for displaying status information;
   a status display control device capable of accepting user inputs and enabling a user of the image capturing device to manually move the status information vertically and horizontally within said camera-back display, where said control device is an electro-mechanical switch located on said back region;
   a memory including a status information storage area comprising one or more status information items of said image capturing device and a picture-in-picture routine capable of generating said status display; and
   a processor communicating with said camera-back display, said status display control device, and said memory, and wherein said processor receives said user inputs and generates said status display, wherein
   said status display control device comprises a center press input switch that toggles an enable state of said status display when pressed.

6. The image capturing device of claim 5, wherein said memory further includes a user-settable display enable variable that enables and disables said status display.

7. The image capturing device of claim 5, wherein said electro-mechanical switch comprises a four-way rocker switch.

8. A status information display method for an image capturing device, comprising:
providing a camera-back display located on a back region of a main body of said image capturing device;
providing a movable status display within said camera-back display; and
providing a status display control device that enables a user of the image capturing device to manually move said status display vertically and horizontally to substantially any position within said camera-back display, wherein
said status display displays one or more status information items relating to operational parameters of said device, and
said status display control device accepts center press inputs and toggles a status display enable state.

9. The method of claim 8, wherein said status display displays said one or more status information items within said camera-back display in a picture-in-picture format.

10. The method of claim 8, wherein said status display displays a flash mode status information.

11. The method of claim 8, wherein said status display displays a battery status information.

12. The method of claim 8, wherein said status display displays an image resolution status information.

13. The method of claim 8, wherein said status display displays a number of captured images.

14. An image capturing device, comprising:
a main body;
a camera-back display located on a back region of said main body and adapted to display a captured image in a display area;
a status display provided within said display area of said camera-back display and adapted to display status information of said image capturing device; and
a status display control device located on said back region that controls a position of said status display within said camera-back display,
wherein said status display control device comprises a five-way rocker switch that controls horizontal and vertical movements of said status display within said camera-back display, and said five-way rocker switch further comprises a center press input switch that toggles an enable state of said status display when pressed.

15. The image capturing device of claim 14, wherein said status display comprises a picture-in-picture display within said camera-back display.

16. The image capturing device of claim 14, wherein the status display control device controls a size of said status display within said camera-back display.

17. The image capturing device of claim 14, wherein the status display control device enables and disables said status display.

18. An image capturing device, comprising:
a camera-back display;
a status display control device capable of accepting user inputs and controlling a status display within said camera-back display;
a memory including a status information storage area comprising one or more status information items of said image capturing device and a picture-in-picture routine capable of generating said status display; and
a processor communicating with said camera-back display, said status display control device, and said memory, and wherein said processor receives said user inputs and generates said status display,
wherein said status display control device comprises a five-way rocker switch that controls horizontal and vertical movements of said status display within said camera-back display, with said five-way rocker switch further comprising a center press input switch that toggles an enable state of said status display when pressed.

19. The image capturing device of claim 18, wherein said memory further includes a user-settable display enable variable that enables and disables said status display.

20. A status information display method for an image capturing device, comprising the steps of:
providing a camera-back display located on a back region of a main body of said image capturing device;
providing a movable status display within said camera-back display; and
providing a status display control device that controls a position of said status display within said camera-back display, wherein
said status display displays one or more status information items relating to operational parameters of said device, and
said status display control device accepts center press inputs and toggles a status display enable state.

21. The method of claim 20, wherein said status display displays said one or more status information items within said camera-back display in a picture-in-picture format.

22. The method of claim 20, wherein said status display control device accepts horizontal movement inputs and correspondingly moves said status display within said camera-back display.

23. The method of claim 20, wherein said status display control device accepts vertical movement inputs and correspondingly moves said status display within said camera-back display.

24. The method of claim 20, wherein said status display displays a flash mode status information.

25. The method of claim 20, wherein said status display displays a battery status information.

26. The method of claim 20, wherein said status display displays a number of captured images.

* * * * *

UNITED STATES PATENT AND TRADEMARK OFFICE
CERTIFICATE OF CORRECTION

| | | |
|---|---|---|
| PATENT NO. | : 7,209,174 B2 | Page 1 of 1 |
| APPLICATION NO. | : 10/083823 | |
| DATED | : April 24, 2007 | |
| INVENTOR(S) | : David Hanson | |

It is certified that error appears in the above-identified patent and that said Letters Patent is hereby corrected as shown below:

In Drawing:
    On sheet 3 of 3, in Fig. 4, in Box "413", line 2, delete "CONTOL" and insert -- CONTROL --, therefor.

Signed and Sealed this

Nineteenth Day of May, 2009

JOHN DOLL
*Acting Director of the United States Patent and Trademark Office*